US005828644A

United States Patent [19]
Gage et al.

[11] Patent Number: 5,828,644
[45] Date of Patent: Oct. 27, 1998

[54] MICROACTUATOR FOR FINE FOCUSING A SLIDER-MOUNTED LENS OF AN OPTICAL DISC DRIVE

[75] Inventors: Edward Charles Gage, Apple Valley; Nicholas Jordache, Eden Prairie, both of Minn.

[73] Assignee: Seagate Technology, Inc., Scotts Valley, Calif.

[21] Appl. No.: 895,257

[22] Filed: Jul. 15, 1997

Related U.S. Application Data

[60] Provisional application No. 60/042,831 Apr. 8, 1997.
[51] Int. Cl.⁶ ........................................................ G11B 7/00
[52] U.S. Cl. ...................... 369/112; 369/44.15; 369/44.14
[58] Field of Search ............................. 369/44.14, 44.21, 369/44.26, 112, 43, 44.15, 44.19

[56] References Cited

U.S. PATENT DOCUMENTS 5,125,750   6/1992   Corle et al. ............................... 369/43

*Primary Examiner*—Tod R. Swann
*Assistant Examiner*—Kim-Kwok Chu
*Attorney, Agent, or Firm*—Kinney & Lange, P.A.

[57] ABSTRACT

A slider assembly for an optical disc drive comprises a slider body having an aerodynamic surface arranged to fly a design distance from a recording surface of a recording medium when the recording medium is rotated at its operating velocity. An objective lens is supported by the slider and defines a focal point at a fixed position relative to the lens. A microactuator is mounted to the slider body to selectively alter the position of the objective lens relative to the slider body. When the slider is flown the design distance from the recording surface, the objective lens may be selectively moved by the microactuator to selectively alter the position of the focal point relative to the recording surface.

23 Claims, 5 Drawing Sheets

MICROACTUATOR FOR FINE FOCUSING A SLIDER-MOUNTED LENS OF AN OPTICAL DISC DRIVE

CROSS-REFERENCE TO RELATED APPLICATIONS

This application claims priority of Provisional Application Ser. No. 60/042,831 filed Apr. 8, 1997 for "Piezoelectric Fine Focus Motor" by Edward C. Gage and Nicholas Jordache.

BACKGROUND OF THE INVENTION

This invention relates to optical disc drives, and particularly to high density optical disc drives that employ lenses supported on sliders that aerodynamically control head/disc spacing.

The head/media interface tolerance for high-density optical discs is on the order of about ±0.1 micron. Component and alignment tolerances, thermal shifts and chromatic effects often lead to de-focus of the optical lens beyond the interface tolerance. Conventional optical disc drives employ objective lenses that are mounted on fixed arms or rails over the support surface for the optical disc. A focus motor is employed to move the objective lens to correct the focus.

Run-out is the condition of variations in the distance between the head and the disc surface, leading to de-focus of the objective lens. Run-out is caused by a lack of parallelism between the lens and the disc surface, which in turn is caused by a number of factors, including unbalanced forces acting on the disc drive spindle, vibration, external noise, disc warpage, lack of perpendicularity of the disc spindle, and lateral motion of the spindle caused by ball bearing imperfections, to name a few. Where the objective lens is at a fixed position relative to the platform supporting the disc, variations in the flatness of the disc is the most common cause of run-out. Where the objective lens is mounted to a flying slider, disc run-out will be of less impact on lens focus because the slider follows undulations in the disc surface, thereby maintaining the position of the objective lens at a fairly constant distance from the disc surface. However, focus shift of the objective lens is still a concern.

In magneto-optical data storage devices, different optical powers are employed for the read and write operations. Most laser diodes used for read/write operations typically exhibit a wavelength shift of about 3.0 nm upon changing modes between the read and write powers. Where a typical objective lens might have a 0.09 micron/nm focal shift as a function of wavelength, a 3.0 nm wavelength change will cause a 0.27 micron focal shift in the objective lens, thereby driving it beyond the head/media interface tolerance. Similar conditions can occur with temperature changes as small as 10 C. degrees.

Presently, focal shift is corrected by mounting one of the relay lenses of the optical path on a focus motor with a low bandwidth focus servo. This serves to stabilize the lens position, but may nevertheless lead to aberrations in the focused spot. These aberrations become more pronounced as the density of recording marks on the disc increases and the optical characteristics of the marks become more difficult to distinguish.

Accordingly, there is a need for more accurate fine positioning of the objective lens on the flying slider relative to the disc surface to account for the effects of tolerances, environmental conditions, and run-out.

SUMMARY OF THE INVENTION

In accordance with the present invention, a microactuator is selectively alters the position of an objective lens carries on a slider to thereby alter the position of the focal point of the lens relative to the slider. In one environment of the invention, different light powers are used in the read and write modes, the light exhibiting different wavelengths at different light powers. Therefore, one aspect of the invention is to alter the position of the focal point of the lens relative to the slider upon a change between the read and write modes.

In accordance with a first embodiment of the present invention, a slider assembly is provided for an optical disc drive in which a slider body has an aerodynamic surface arranged to fly a design distance from a recording surface of an optical recording medium. An objective lens is supported by the slider body to define a focal point at a fixed position relative to the lens. A microactuator is mounted to the objective lens to selectively alter the position of the objective lens relative to the slider body.

In one aspect of the first embodiment of the invention, a solid immersion lens is mounted to the slider in the light path through the slider between the lens and the focal point. In accordance with another aspect of the first embodiment of the present invention, the optical disc drive is operable to both write and record marks in the recording medium. The microactuator is operable in response to a change of operation of the light source between read and write modes to alter the focal point of the objective lens relative to the slider body.

In accordance with a second embodiment of the present invention an adjustable lens assembly is provided having a rigid support member. A first lens is supported by the support member to define a light path though the support member to a focal point outside the support member at a position relative to the first lens based on a wavelength of light passed by the first lens. A second lens is mounted to the support member in the light path. A microactuator is mounted to the support member to selectively alter the position of the first lens relative to the support member. One aspect of the second embodiment of the invention is that the first lens is an objective lens and the second lens is a solid immersion lens.

In accordance with a third embodiment of the present invention, an optical disc drive includes a rotatable optical recording medium having a recording surface having a plurality of concentric tracks along which data may be recorded as marks, and along which data may be recovered by optically sensing marks when the optical medium is rotated at an operating velocity. An optical system has a light source for supplying light having a selected first or second power. An objective lens directs light supplied by the light source at the recording surface. The objective lens defines a focal point at a position relative to the lens based on the wavelength of the supplied light. A light detector is operatively associated with the objective lens to receive light reflected from the recording surface. A slider supports the objective lens. An actuator arm supports the slider adjacent a selected track on the optical recording medium. The slider has an aerodynamic surface to fly a design distance from the recording surface when the recording medium is rotated at the operating velocity. A microactuator on the slider is operable to selectively alter the position of objective lens relative to the slider.

In one aspect of the third embodiment of the invention, a solid immersion lens is mounted to the slider in the light path through the slider between the lens and the focal point. In another aspect of the third embodiment, the light source is operable at a first power to direct light through the objective lens at the recording surface to record marks in the recording medium and is operable at a second power to direct light through the objective lens at the recording surface to reflect light from the recording surface through the objective lens to the light detector. Another aspect of this embodiment of the invention includes operating the microactuator to alter the position of the focal point of the objective lens with respect to the slider when the operation of the light source is changed between the first and second powers.

In accordance with another aspect of this third embodiment, a mirror is supported by the actuator to direct light to and from the objective lens, the mirror being operable with the actuator arm by a motor. The light source and light detector are supported by the actuator to direct light to and from the mirror.

In accordance with a fourth embodiment of the present invention, a method is provided for optimizing the position of the focal point of an objective lens of a disc drive optical system in which the optical system includes an actuator arm having a slider body arranged to fly an objective lens a design distance from a recording surface of an optical recording medium. The method comprises flying the slider at the design distance, and selectively moving the objective lens In relative to the slider body to alter the position of the focal point relative to the recording surface.

In accordance with one aspect of the fourth embodiment, the optical disc drive is operable in a write mode to write data marks in the recording medium by directing light at a first power through the objective lens at the recording surface and is operable in a read mode to read data marks in the recording medium by directing light at a second power through the objective lens at the recording surface to reflect light from the recording surface through the objective lens to a light detector. The method further includes moving the objective lens in response to a change between the read and write modes of the disc drive.

DETAILED DESCRIPTION OF THE PREFERRED EMBODIMENTS

Figure 1:
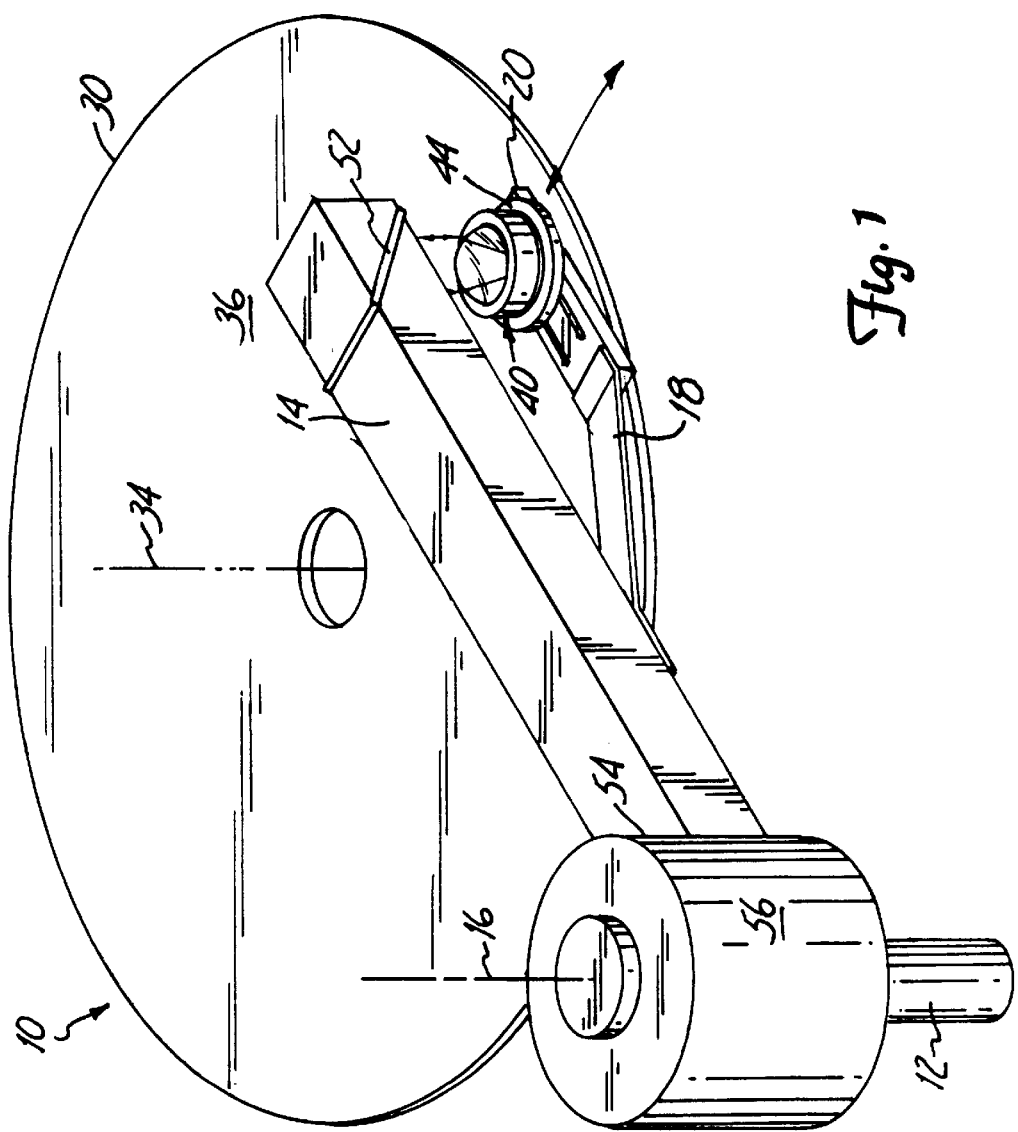
FIG. 1 is a perspective view of an optical disc drive in accordance with the presently preferred embodiment of the present invention.
Figure 2:
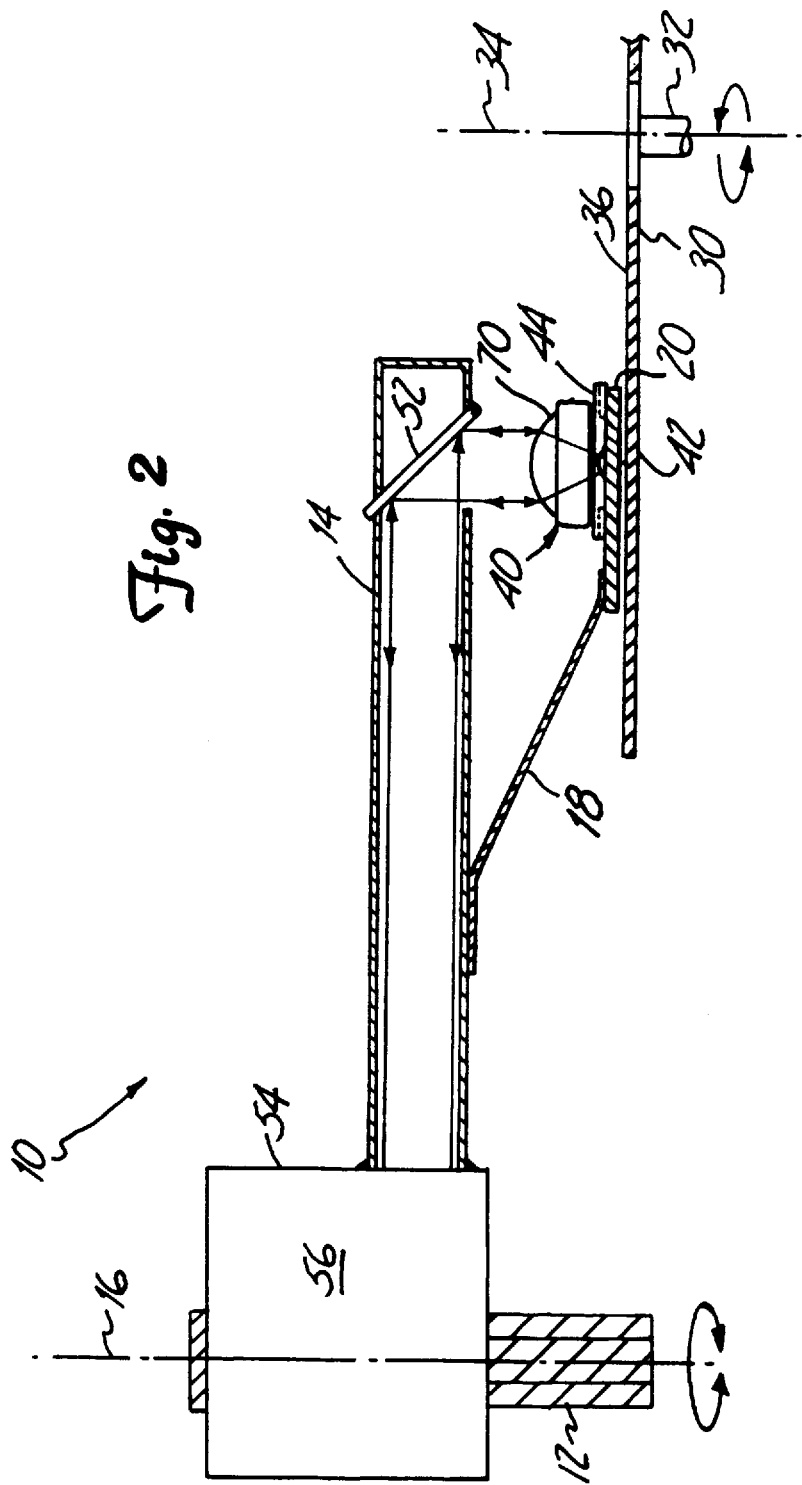
FIG. 2 is a section view of a rotary actuator arm and optics of the disc drive of FIG. 1.

FIGS. 1 and 2 illustrate a rotary actuator assembly for an optical disc drive in accordance with the presently preferred embodiment of the present invention. The actuator assembly includes an actuator spindle 12 having a hollow actuator arm 14 mounted thereto for rotation about actuator axis 16. A gimbal spring 18 is mounted to actuator arm 14 and carries a slider 20. In one embodiment, the body of slider 20 is transparent and one or more rails 22 (FIGS. 4 and 6) having smooth aerodynamic surfaces 24 extend from the slider body to confront optical disc 30. Disc 30 is mounted to disc spindle 32 to rotate about disc axis 34 at a design operational velocity. When so rotating, windage associated with disc 30 reacts against aerodynamic surfaces 24 (FIG. 6) of slider 20 to cause slider 20 to "fly" a small distance above the surface 36 of disc 30. As is well known in the art, the aerodynamic characteristics of slider 20, together with the spring bias of gimbal 18 and any load beam (not shown) imposed on gimbal 18, cause slider 20 to "fly" a design distance from confronting surface 36 of disc 30.

Lens assembly 40 is supported by slider 20 and includes an objective lens 70 having a focal point 42 in fixed position to lens 70. Actuator arm 14 supports mirror 52 immediately adjacent lens assembly 40. Housing 54 is supported by actuator spindle 12 and contains an optical module 56, shown in greater detail in FIG. 3.

Slider 20 includes a microactuator 44 between the body of slider 20 and lens assembly 40. Microactuator 44 is arranged to adjust the position of lens 70 with respect to the body of slider 20 to thereby alter the position of focal point 42 with respect to the slider. Since slider 40 is designed to fly a predetermined distance from surface 36 of disc 30 when the disc is rotated at its operational velocity, microactuator 44 selectively adjusts the position of focal point 42 with respect to the disc surface.

Figure 3:
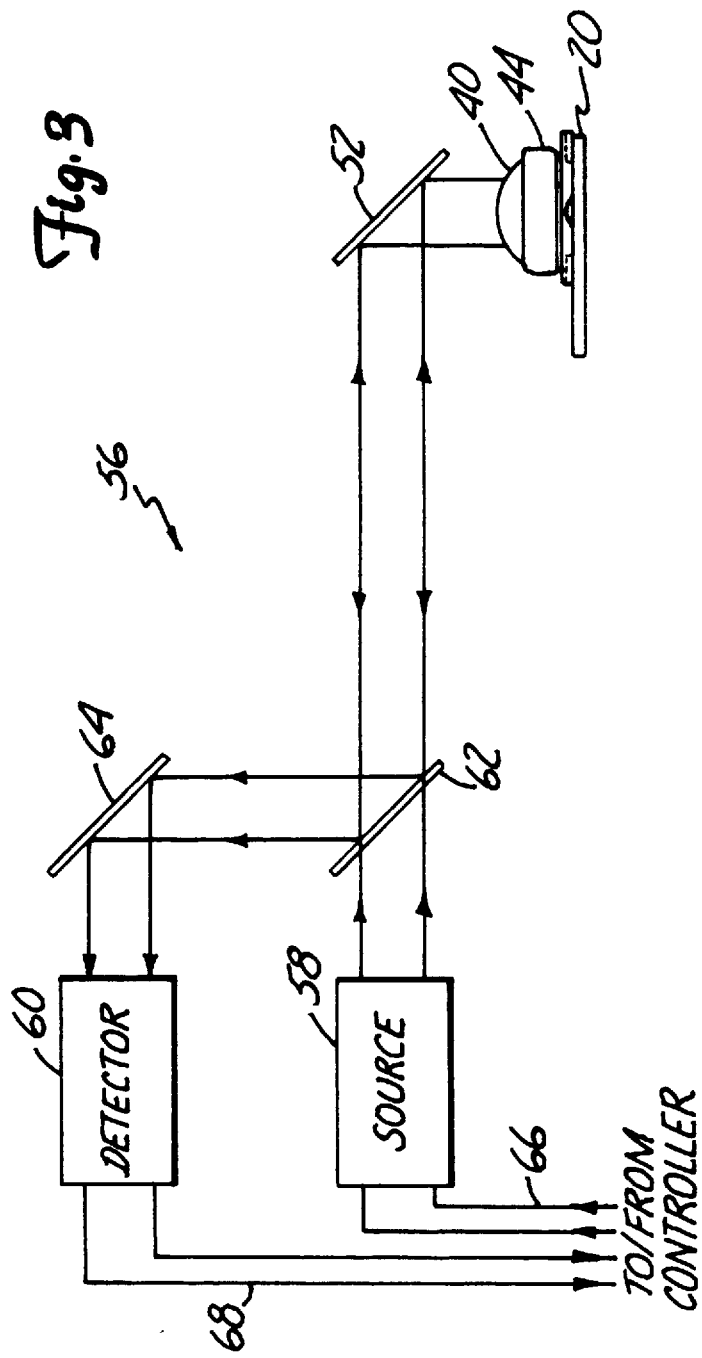
FIG. 3 is a diagram of the optical paths of an optical module used in the optical disc drive of FIG. 1.

As shown particularly, in FIG. 3, optical module 56 includes a laser light source 58 arranged to emit collimated light in the form of a beam, and detector 60 arranged to detect collimated light. Splitter 62 is well known in the art as a device that is partially transparent to light impinging it from one side and partially reflective of light impinging it from the opposite side. Splitter 62 is arranged in respect of source 58 to direct source light radiation from source 58 through splitter 62 and along a light path following mirror arm 50 (FIG. 2) to mirror 52, where it is redirected through lens assembly 40 to focal point 42 (FIG. 2). Light reflected from disc 30 is transmitted through lens assembly 40, reflected by mirror 52 to splitter 62, reflected by splitter 62 to mirror 64 to impinge on detector 60. Source 58, which is a typical laser source well known in the art, is operated via input leads 66 from the disc drive controller (not shown) and signals generated by detector 60 are provided via leads 68 to the controller. Other light paths may be included within module 56, as is well known in the art. For example, light from source 58 may be reflected by splitter 62 away from the detection light path for control purposes.

As is well-known in the operation of a typical optical drive, information is written to disc 30 by applying digital signals from the controller to light source 58 to provide a pulsed laser output through lens assembly 40 to the surface of disc 30. The strength and wavelength of the laser pulses are such as to heat the surface of the optical disc to form optically distinctive marks or optical modifications in the otherwise reflective optical disc. Because the disc is rotating, these marks are recorded as a series of optical modifications along concentric tracks, the marks being recorded at a frequency and representing data in a manner well known in the art. In a read mode, source 58 is operated continuously, usually at a lower power and slightly different optical wavelength than a write operation, to provide light through lens 40 to impinge against the surface 36 of disc 30. Marks on the disc, having distinctive optical characteristics, reflect the light differently than from areas where there are no marks. As a result, the reflected light constitutes a series of light pulses representing the marks, and hence the data recorded on the disc. The reflected light is transmitted through lens assembly 40 and reflected by mirror 52, splitter 62 and mirror 64 to be detected by detector 60 as a series of light pulses of varying intensity, based on the reflections of light from the marks and regions where there are no marks (non-marks). While the present invention is described in connection with an intensity-based readout, as might be employed with erasable phase change media, it is equally applicable to phase-based readout, as employed with CD-ROM media, and polarization-based readout, as employed with magneto-optical media. The impinging light on detector 60 creates a digital signal which is transmitted back to the controller and recovered as data.

One problem in optical recording results from the narrow head/media interface tolerance between the objective lens and the disc surface. More particularly, if focal point 42 is moved more than about 0.1 micron normal to surface 36, light transmitted through lens 70 from source 58 becomes de-focused, generating a larger than intended spot of light on the disc surface. In a write mode, the larger than intended spot may generate an oversized mark which could encroach on adjacent mark positions along the track, or even encroach on an adjacent track. Mark encroachment results in poor optical resolution on reading, leading to erroneous data recovery from the disc. The larger than intended light spot might also generate poorly defined marks, leading to errors in data recovery. In a read mode, the oversized spot might cause simultaneous reflection of light from regions containing marks as well as regions not containing marks (mark and non-mark regions), thereby resulting in errors in data recovery. When switching between a read and write mode, the wavelength from source 58 may be changed, thereby additionally shifting the focal point of lens 70 by an amount greater than the head/media interface tolerance. To overcome this problem, the present invention employs microactuator 44 between objective lens 70 and the body of slider 20.

Figure 4:
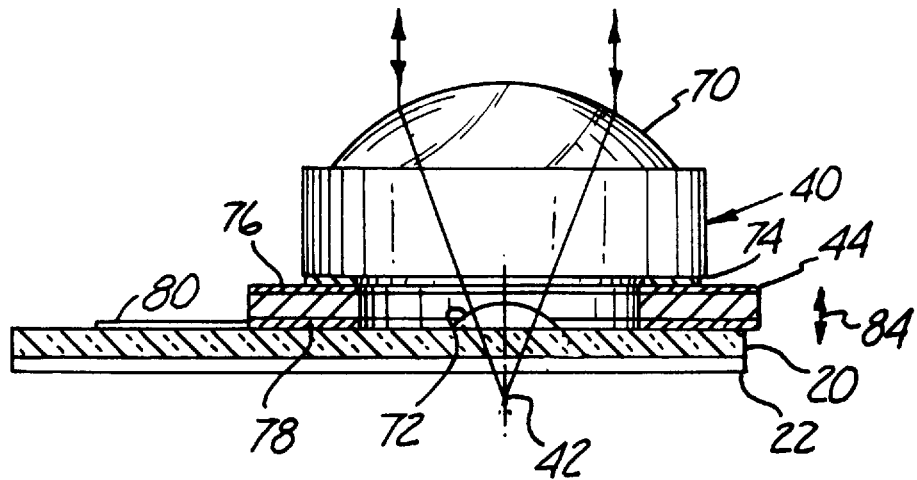
FIG. 4 is an enlarged section view of an aerodynamic slider assembly used in the invention of FIG. 1.
Figure 5:
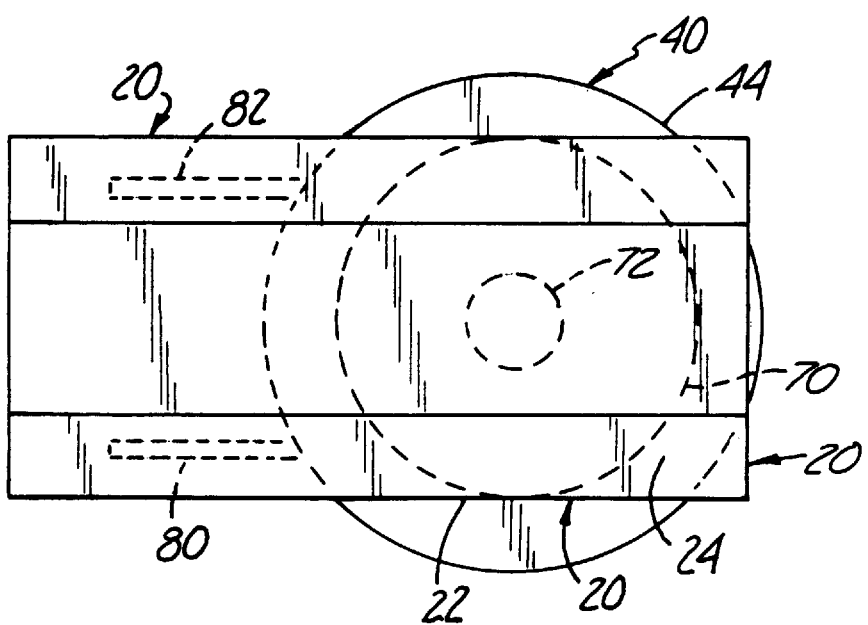
FIG. 5 is a perspective view of the slider assembly shown in FIG. 4.
Figure 6:
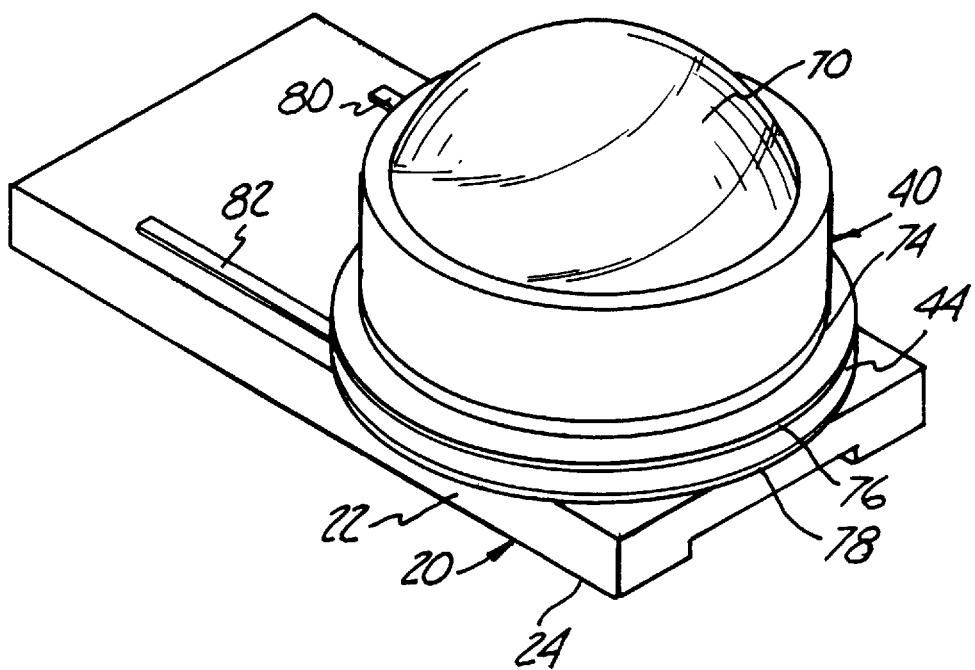
FIG. 6 is a bottom view of the slider assembly shown in FIG. 4.

FIGS. 4–6 illustrate transparent slider 20 supporting the lens assembly 40. Lens assembly includes objective lens 70 and a solid immersion lens (SIL) 72. A piezoelectric ring structure 44 is fastened on one side to objective lens 70 and on the other side to a top surface of slider 20, opposite the surface that confronts disc 30. Piezoelectric ring 44 may be integrally formed with slider body 20 by thin film techniques during the formation of slider 20, and may be fastened to objective lens 70 by adhesive. SIL 72 may be fastened to slider 20 by a transparent adhesive or may be integrally formed with slider 20. In practice, Microactuator 44 may comprise a single crystal or a plurality of stacked, laminated crystals. In either case a top contact 76 and a bottom contact 78 are connected to the piezoelectric ring and are connected to pads 80 and 82 on slider 20. Upon application of a design voltage to pads 80 and 82, microactuator 44 selectively expands or contracts to move objective lens 70 in the direction of arrow 84 to thereby selectively position the location of focal point 42. The movement of the objective lens is axially along the light path through the lens and through SIL 72.

As shown particularly in FIG. 4, SIL 72 is fixed in position to the slider body, whereas objective lens 70 is selectively axially positioned by microactuator 44 with respect to SIL 72. This preferred arrangement minimizes aberration in the light path.

Upon a change in mode of the disc drive between read and write or erase, the power of the light beam is changed, changing the wavelength of the light passing through the objective lens, thereby altering the distance from the objective lens to the focal point 42. At the time of mode change, the a voltage to pads 80 and 82 is also changed, altering the distance between objective lens 70 and slider 20, as well as between objective lens 70 and SIL 72. The voltage to pads 80 and 82 is controlled by the drive controller (not shown) which operates to change the voltage a design amount on mode change. Hence, the position of focal point 42 is changed on a mode change between read and write/erase, to correct for focal shift caused by changes in wavelength or environmental conditions, such as temperature, or to correct the position of the focal point may for changes in drive performance. A controller for use with the microactuator of the present invention might, for example, include a lookup table of drive signal values to select the proper drive signal, or voltage value, to position lens 70 for the read and write modes for various system configurations and for environmental conditions. Such a lookup table might, for example, contain drive signal values for various media or media properties and other system configurations, as well as temperature and other environmental conditions.

Although the present invention has been described with reference to preferred embodiments, workers skilled in the art will recognize that changes may be made in form and detail without departing from the spirit and scope of the invention.

What is claimed is:

1. An optical disc drive having
   a rotatable optical recording medium having a recording surface having a plurality of concentric tracks along which data may be recorded as marks having distinctive optical characteristics and along which data may be recovered by optically sensing marks when the recording medium is rotated at an operating velocity;
   an actuator arm supporting a slider adjacent a selected track on the optical recording medium;
   a microactuator supported by the slider, the microactuator being operable to selectively expand and contract; and
   an optical system having
      a light source for supplying light,
      an objective lens mounted to the microactuator, the objective lens directing light supplied by the light source at the recording surface, the objective lens defining a focal point at a position relative to the lens, and
      a light detector operatively associated with the objective lens to receive light reflected from the recording surface;
   the microactuator being operable to move the objective lens relative to the slider to thereby move the position of the focal point relative to the slider.

2. The optical disc drive of claim 1, wherein the objective lens defines a light path through the slider between the lens and the focal point, and a solid immersion lens mounted to the slider in the light path.

3. The optical disc drive of claim 1, wherein the microactuator is integrally formed in the slider.

4. The optical disc drive of claim 1, wherein the objective lens is adhesively fastened to the microactuator.

5. The optical disc drive of claim 1, wherein the microactuator is a piezoelectric motor.

6. The optical disc drive of claim 1, wherein the light source is operable at a first power to direct light through the objective lens at the recording surface to record marks in the recording medium and is operable at a second power to direct light through the objective lens at the recording surface to reflect light from the recording surface through the objective lens to the light detector.

7. The optical disc drive of claim 6, including means for operating the microactuator to alter the position of the focal point of the objective lens with respect to the slider when the operation of the light source is changed between the first and second powers.

8. The optical disc drive of claim 6, wherein the microactuator is integrally formed in the slider.

9. The optical disc drive of claim 6, wherein the objective lens is adhesively fastened to the microactuator.

10. The optical disc drive of claim 6, wherein the objective lens defines a light path through the slider between the lens and the focal point, and a solid immersion lens mounted to the slider in the light path.

11. The optical disc drive of claim 6, wherein the light through the objective lens at the first power has a first wavelength and the light through the objective lens at the second power has a second wavelength different from the first wavelength.

12. A slider assembly for an optical disc drive comprising:
  a slider body;
  a microactuator supported by the slider, the microactuator being operable to selectively expand and contract; and
  an objective lens supported by the microactuator and defining a focal point located at a fixed position relative to the lens and based on a wavelength of light passed by the objective lens;
  the microactuator being operable to selectively move the objective lens relative to the slider body to thereby move the position of the focal point relative to the slider body.

13. The slider assembly of claim 12, wherein the objective lens defines a light path through the slider between the lens and the focal point, and a solid immersion lens mounted to the slider in the light path.

14. The slider assembly of claim 12, wherein the microactuator is integrally formed in the slider.

15. The slider assembly of claim 12, wherein the microactuator is a piezoelectric motor.

16. The slider assembly of claim 12, wherein the optical disc drive is operable to write data marks in a recording medium by directing light having a first power through the objective lens at a recording surface and is operable to read data marks in the recording medium by directing light having a second power through the objective lens at the recording surface to reflect light from the recording surface through the objective lens to a light detector, the microactuator being operable in response to a change in operation of a light source between the first and second powers to alter the position of the focal point of the objective lens relative to the slider body.

17. The slider assembly of claim 16 wherein the source is operable to provide light at the first power to write data marks and to provide light at the second power to read data marks, a first wavelength being associated with the first power and a second wavelength being associated with the second power.

18. The slider assembly of claim 16, wherein the objective lens defines a light path through the slider between the lens and the focal point, and a solid immersion lens mounted to the slider in the light path.

19. An adjustable lens assembly comprising
  a rigid support member;
  a microactuator supported by the support member, the microactuator being operable to selectively expand and contract;
  an objective lens mounted to the microactuator defining light path though the support member to a focal point outside the support member at a position relative to the objective lens based on a wavelength of light passed by the objective lens;
  a second lens mounted to the support member in the light path;
  the microactuator being operable to selectively move the objective lens relative to the support member.

20. The adjustable lens assembly of claim 19, wherein the first lens is an objective lens and the second lens is a solid immersion lens.

21. The method of optimizing the position of the focal point of an objective lens of a disc drive optical system in which the optical system includes an actuator arm having a slider body arranged to be positioned by the actuator arm relative to a recording surface of an optical recording medium, the slider body supporting a microactuator which supports the objective lens, the microactuator being operable to selectively expand and contract, the method comprising:
  positioning the slider body at a selected position relative to the recording surface, and
  selectively operating the microactuator to move the objective lens relative to the slider body to selectively move the position of the focal point relative to the recording surface.

22. The method of claim 21, wherein the optical disc drive is operable in a write mode to write data marks in the recording medium by directing light having a first power through the objective lens at the recording surface and is operable in a read mode to read data marks in the recording medium by directing light having a second power through the objective lens at the recording surface to reflect light from the recording surface through the objective lens to a light detector, the method further including operating the microactuator in response to a change between the read and write modes of the disc drive to move the objective lens.

23. The method of claim 22, wherein the light through the objective lens at the first power has a first wavelength and the light through the objective lens at the second power has a second wavelength different from the first wavelength.

* * * * *